United States Patent [19]
Harlap et al.

[11] Patent Number: 5,793,655
[45] Date of Patent: Aug. 11, 1998

[54] SUM OF THE ABSOLUTE VALUES GENERATOR

[75] Inventors: Michal Harlap, Tel Aviv; Amir Freizeit, Ra'anana; Erez Sperling, Amikam; Gil Skaletzky, Karkur; Moshe Steiner, Haifa, all of Israel

[73] Assignee: Zapex Technologies, Inc., Mountain View, Calif.

[21] Appl. No.: 740,046

[22] Filed: Oct. 23, 1996

[51] Int. Cl.$^6$ .............................. G06F 7/00; G06F 7/50
[52] U.S. Cl. ........................... 364/715.012; 364/769
[58] Field of Search ........................ 364/715.012, 768, 364/769

[56] References Cited

U.S. PATENT DOCUMENTS

| | | | |
|---|---|---|---|
| 4,761,759 | 8/1988 | Nakagawa | 364/769 |
| 4,849,921 | 7/1989 | Yasumoto et al. | 364/769 |
| 4,953,115 | 8/1990 | Kanoh | 364/769 |
| 5,148,386 | 9/1992 | Hori | 364/769 |
| 5,216,628 | 6/1993 | Mizutani et al. | 364/769 |
| 5,305,249 | 4/1994 | Yoshida | 364/769 |
| 5,546,335 | 8/1996 | Lee | 364/769 |
| 5,563,813 | 10/1996 | Chen et al. | 364/769 |

Primary Examiner—Tan V. Mai
Attorney, Agent, or Firm—McDermott, Will & Emery

[57] ABSTRACT

An apparatus for processing sum of the absolute differences (SAD) is disclosed. A novel circuit is disclosed which eliminates the requirement of taking the absolute value of intermediate partial sum results. The absolute value function is only needed after the final summation stage. Subtraction units take the difference between each pair of values to be processed. The output of the subtraction units are input to a first level of two input summation units. If there is more than one summation unit in the first level, the output of these summation units are input to a second level of summation units. At each level half the number of units are required until a level is reached having only one unit. The absolute value of the last unit is then taken which forms the final SAD result. Each summation unit performs an addition on its two inputs while preserving the magnitude of their sum. Depending on the sign of one of the inputs, the two inputs are either added to each other or subtracted from each other. The sign bit of both inputs are checked in order to determine whether to add or subtract. In addition, the present invention can be implemented as a sum of the absolute values (SA) generator for adding any type of values and not just for difference values. The SA generator likewise preserves the magnitude of the partial sum results thus requiring only a single absolute value function after the final summation unit.

19 Claims, 8 Drawing Sheets

SUM OF THE ABSOLUTE VALUES GENERATOR

FIELD OF THE INVENTION

The present invention relates generally to circuitry for performing motion estimation and more particularly relates to SAD processing methods and circuitry.

BACKGROUND OF THE INVENTION

The sum of the absolute differences (SAD) between two values or sets of values is a frequently used function in many signal processing applications. Typically the function is computed by first performing the difference function between the two sets of inputs, taking their absolute value and then adding up all the absolute values. A disadvantage of this technique, however, is that it requires a great deal of hardware to perform, especially if the difference between large sets of values is required. Large sets of data are typical in such applications as video signal processing where motion estimation techniques are utilized to encode a reduced rate video signal (e.g., MPEG encoding). In these applications it is not uncommon to need to take the sum of the absolute differences between two sets of data each, for example, having 256 values. In this case, 256 absolute value functions are required. The absolute values are then summed to produce the final SAD result.

SUMMARY OF THE INVENTION

Accordingly, it is an object of the present invention to provide a SAD generator that overcomes the limitations and disadvantages of the prior art.

It is another object of the present invention to provide a SAD generator that does not require an absolute value function until after the final summation step.

Another object of the present invention is to provide a SAD generator that preserves the magnitude of intermediate summation results regardless of the sign of previous results.

Yet another object of the present invention is to provide a SAD generator that is able to be applied to video motion estimation systems.

An apparatus for processing sum of the absolute differences (SAD) is disclosed. A novel circuit is disclosed which eliminates the requirement of taking the absolute value of intermediate partial sum results. The absolute value function is only needed after the final summation stage. Subtraction units take the difference between each pair of values to be processed. The output of the subtraction units are input to a first level of two input summation units. If there is more than one summation unit in the first level, the output of these summation units are input to a second level of summation units. At each level half the number of units are required until a level is reached having only one unit. The absolute value of the last unit is then taken which forms the final SAD result. Each summation unit performs an addition on its two inputs while preserving the magnitude of their sum. Depending on the sign of one of the inputs, the two inputs are either added to each other or subtracted from each other. The sign bit of both inputs are checked in order to determine whether to add or subtract. In addition, the present invention can be implemented as a sum of the absolute values (SA) generator for adding any type of values and not just for difference values. The SA generator likewise preserves the magnitude of the partial sum results thus requiring only a single absolute value function after the final summation unit.

There is thus provided in accordance with a preferred embodiment of the present invention a sum of the absolute values (SA) generator for summing the absolute values of a plurality of values, comprising a plurality of levels, each level comprising a plurality of summation units, each summation unit having a first and second input and an output, within a first level, the first and second inputs of each the summation unit coupled to one of the plurality of inputs, the outputs of every two the subtraction units coupled to the first and second inputs of a summation unit, at each successive level, the outputs of two the summation units coupled to the first and second input of a summation unit in the next successive level until a level has only one final summation unit, each the summation unit operative to sum the values present at its first and second inputs while preserving the magnitude thereof regardless of its sign, and an absolute value generator having an input and an output, the output of the final summation unit coupled to the input of the absolute function generator, the output of the absolute function generator forming the output of the SA generator.

In addition, the summation unit comprises an adder/subtractor. The adder/subtractor comprises an adder having a first and a second input, a carry in input and an output, the first input of the summation unit coupled to the first input of the adder, the output of the adder forming the output of the summation unit, a 2 to 1 multiplexor having a first and a second input, an output and a control input, the first input of the multiplexor coupled to the second input of the summation unit, an inverter having an input and an output, the second input of the summation unit coupled to the input of the inverter, the output of the inverter coupled to the second input of the multiplexor, and an XOR gate having two inputs and an output, the sign bits of the first and second inputs to the summation unit coupled to the inputs of the XOR gate, the output of the XOR gate coupled to the control input of the multiplexor and to the carry in input of the adder.

The summation unit comprises means for generating the sum of the magnitudes of the values present at the first and second inputs of the summation unit regardless of the sign of the values.

There is also provided in accordance with a preferred embodiment of the present invention a sum of the absolute difference (SAD) generator for summing the absolute difference between a first and second set of values, comprising a plurality of subtraction units, each subtraction unit having a first and second input and an output, the first set of values coupled to the first inputs of the plurality of subtraction units, the second set of values coupled to the second inputs of the plurality of subtraction units, a plurality of levels, each level comprising a plurality of summation units, each summation unit having a first and second input and an output, within a first level, the outputs of every two the subtraction units coupled to the first and second inputs of a summation unit, at each successive level, the outputs of two the summation units coupled to the first and second input of a summation unit in the next successive level until a level has only one final summation unit, each the summation unit operative to sum the values present at its first and second inputs while preserving the magnitude thereof regardless of its sign, and an absolute value generator having an input and an output, the output of the final summation unit coupled to the input of the absolute function generator, the output of the absolute function generator forming the output of the sum of the absolute difference generator.

In addition, the subtraction unit comprises a subtractor. The subtraction unit comprises means for calculating the difference between the values present at the first and second input of the subtraction unit. The summation unit comprises an adder/subtractor having a control input, and an XOR gate having two inputs and an output, the sign bits of the first and second inputs to the summation unit coupled to the inputs of the XOR gate, the output of the XOR gate coupled to the control input of the adder/subtractor.

The adder/subtractor comprises an adder having a first and a second input, a carry in input and an output, the first input of the summation unit coupled to the first input of the adder, the output of the adder forming the output of the summation unit, a 2 to 1 multiplexor having a first and a second input, an output and a control input, the control input of the multiplexor forming the control input of the adder/subtractor, the first input of the multiplexor coupled to the second input of the summation unit, and an inverter having an input and an output, the second input of the summation unit coupled to the input of the inverter, the output of the inverter coupled to the second input of the multiplexor.

The summation unit comprises means for generating the sum of the magnitudes of the values present at the first and second inputs of the summation unit regardless of the sign of the values.

Further, there is provided in accordance with a preferred embodiment of the present invention a sum of the absolute differences (SAD) processing system, the processing system summing the absolute difference between a first and second set of values, the values derived from blocks of pixels, the system comprising a plurality of subtraction units, each subtraction unit having a first and second input and an output, the first set of values coupled to the first inputs of the plurality of subtraction units, the second set of values coupled to the second inputs of the plurality of subtraction units, a plurality of levels, each level comprising a plurality of summation units, each summation unit having a first and second input and an output, within a first level, the outputs of every two the subtraction units are coupled to the first and second inputs of a summation unit, at each successive level, the outputs of two the summation units are coupled to the first and second input of a summation unit until a level has only one final summation unit, an absolute value generator having an input and an output, the output of the final summation unit coupled to the input of the absolute function generator, the output of the absolute value generator forming the sum of the absolute differences, and means for determining at least one SAD result from blocks of pixels derived from a video signal.

The at least one SAD result comprises the sum of the absolute differences for a block of pixels having a motion vector of 0, 0; the minimum SAD over a range of blocks of pixels; or a zero detect signal corresponding to a current SAD value being equal to a current minimum SAD value.

The video signal comprises a separate top field or a separate bottom field.

In addition, the system further comprises means for determining sum of the absolute difference results from the combination of sum of the absolute differences from a top video field and a bottom video field.

There is also provided in accordance with a preferred embodiment of the present invention a method of generating a sum of the absolute differences between a first and second set of values, the method comprising the steps of subtracting values in the second set from corresponding values in the first set, the subtraction possibly producing both positive and negative differences, summing the differences while preserving the magnitude of each difference regardless of its sign, generating a final sum result, and determining the absolute value of the final sum result.

Further, there is provided in accordance with a preferred embodiment of the present invention a method of generating a sum of the absolute values of a plurality of values, the method comprising the steps of summing the plurality of values while preserving the magnitude of each individual value regardless of its sign, generating a final sum result, and determining the absolute value of the final sum result.

In addition, the summation unit comprises a third input, a forth input and determining means for deciding whether to add the first input to the second input or subtract the second input from the first input in accordance with the values of the third and forth input, the third input coupled to the most significant bit of the first input to the summation unit in a level directly preceding the current level whose output is coupled to the first input of the summation unit, the forth input coupled to the most significant bit of the first input to the summation unit in a level directly preceding the current level whose output is coupled to the second input of the summation unit, the determining means operative to reduce the propagation delay of the summation units within the current level.

BRIEF DESCRIPTION OF THE DRAWINGS

The invention is herein described, by way of example only, with reference to the accompanying drawings, wherein.

DETAILED DESCRIPTION OF THE INVENTION

Figure 1:
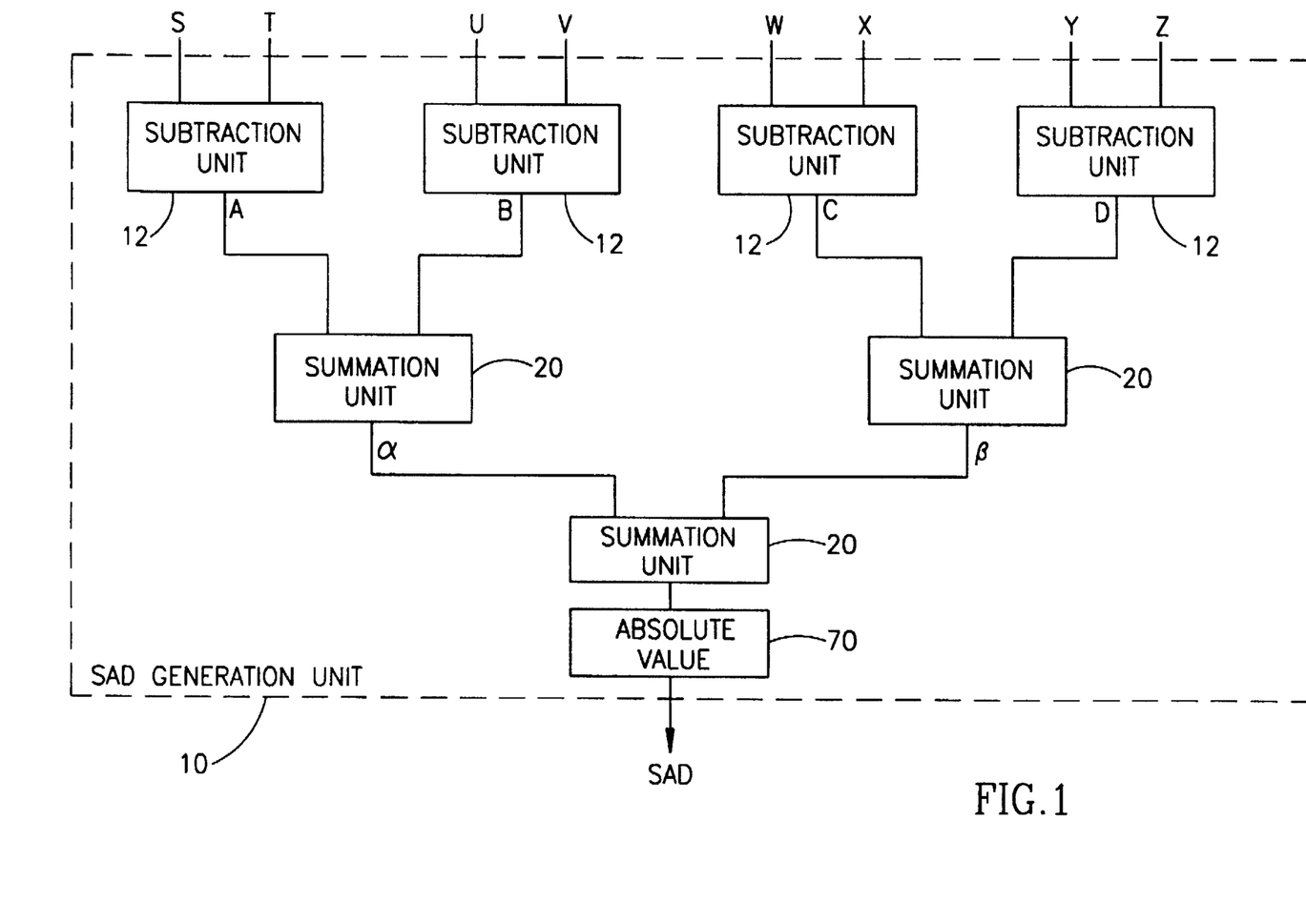
FIG. 1 is a high level block diagram illustrating the SAD generation unit of the present invention.

A high level block diagram illustrating the SAD generation unit, generally referenced 10, of the present invention is shown in FIG. 1. The function of the sum of differences (SAD) generation unit is to perform a sum of the differences calculation on pairs of input values. To aid in understanding the principles of the present invention, the SAD processor is presented within the context of a motion estimation system for use within a video encoding framework such as MPEG. This, however, does not limit the utilization of the present invention in any way in other applications.

One of the requirements of processing a video signal to generate an MPEG encoded output is to calculate the difference between successive frames of the signal. Much bandwidth can be reduced by sending the differences between frames rather than sending the entire frame. The assumption is that typically only a small portion of the frame actually moves. Thus, calculating and transmitting the differences can significantly reduce the bandwidth of the encoded signal. These differences are termed motion vectors. A separate motion vector for each 16×16 pixel block in the frame is calculated. The circuit of the present invention can be used to directly calculate the value for the motion vectors.

Shown in FIG. 1 is an example of a SAD generation unit constructed in accordance with the principles of the present invention. The example shown in FIG. 1 is capable of calculating the sum of the absolute differences between two sets of four values. Using the principles illustrated in FIG. 1, however, SAD generators can be constructed to calculate the sum of the absolute differences between any arbitrary number of values. Presented below, the SAD circuit shown in FIG. 1 is applied to a larger SAD circuit used to calculate the SAD between two 16×16 pixel blocks.

With reference to FIG. 1, the SAD generation unit 10 comprises four subtraction units 12, three summation units 20 and an absolute value generator 70. The subtraction units 12 calculate the difference between the set of input values S, U, W and Y and the set of input values T, V, X and Z. The set of values S and T are input to the first subtraction unit which functions to generate the difference A. The set of values U and V are input to the second subtraction unit which functions to generate the difference B. The set of values W and X are input to the third subtraction unit which functions to generate the difference C. The set of values Y and Z are input to the forth subtraction unit which functions to generate the difference D.

The difference values A and B are input to a summation unit 20 which functions to calculate the value α. The difference values C and D are input to a second summation unit which calculates the value β. The two values α and β are input to a third summation unit which generates the final sum value. The output of the final summation unit is then input to an absolute value generator 70. The output of the absolute value generator 70 is the final SAD value.

It is important to note that the SAD circuit of the present invention only requires one absolute value function after the last summation unit. The absolute values of the intermediate sums do not need to be calculated. The summation unit 20 will be described in more detail below.

Figure 2:
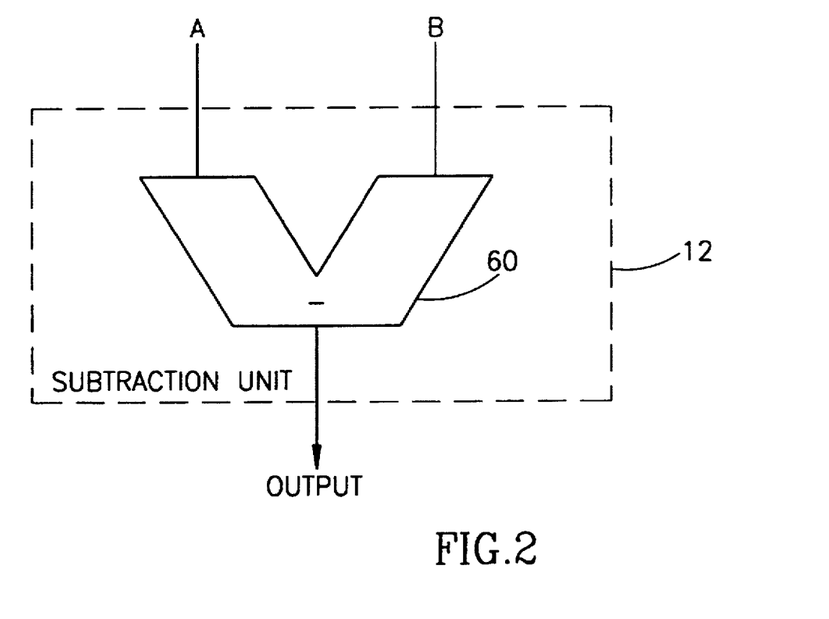
FIG. 2 is a high level block diagram illustrating the subtraction unit portion of the SAD generation unit.

A high level block diagram illustrating the subtraction unit portion 12 of the SAD generation unit is shown in FIG. 2. The subtraction unit 12 comprises a subtractor 60 having two inputs represented as A and B and generates an output representing A–B. Note that in order to achieve a full range of output values, the output must have an additional bit over the number of bits of the two input values A and B. Thus, for example, if A and B are eight bit values, the output should be represented by nine bits in order to handle the full range of possible output values.

Figure 3:
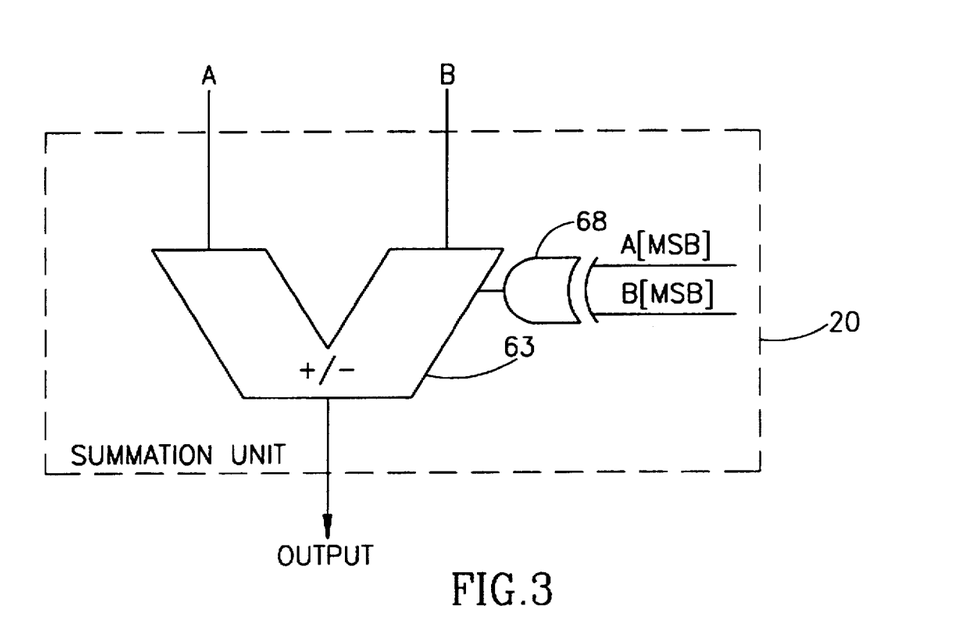
FIG. 3 is a high level block diagram illustrating the summation unit portion of the SAD generation unit.

A high level block diagram illustrating the summation unit portion 20 of the SAD generation unit is shown in FIG. 3. The summation unit 20 is capable of summing the magnitude of two numbers regardless of their sign. The summation unit comprises an adder/subtractor 63 which incorporates the necessary logic to determine whether to add or subtract. Coupled to the adder/subtractor 63 is an XOR gate 68. The two inputs of the XOR gate are coupled to the MSB of the inputs to the adder/subtractor. The output of the XOR gate determines whether the adder/subtractor adds or subtracts. This decision is based on the sign of both the inputs. It is important to note that the operation of the summation unit is to preserve the magnitude of the sum no matter what the sign of the two inputs are.

Figure 4:
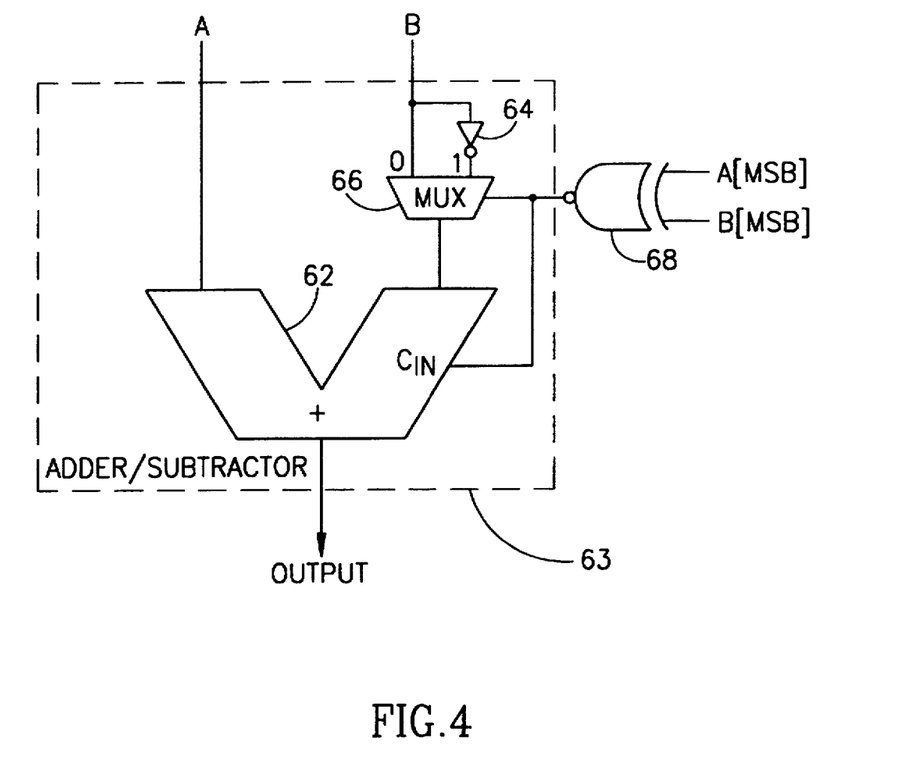
FIG. 4 is a high level block diagram illustrating the adder/subtractor portion of the summation unit in more detail.

A high level block diagram illustrating the adder/subtractor portion of the summation unit in more detail is shown in FIG. 4. The adder/subtractor portion 63 of the summation unit 20 comprises an adder 62, a 2 to 1 multiplexor (mux) 66 and an inverter 64. The XOR gate 68 is also shown for clarity.

One of the two inputs A is input to one of the inputs to the adder 62. The other of the two inputs B is input to one of the inputs of the mux 66 and to the input of inverter 64. The width of the inverter 64 is made to match the width of the B input. Thus, if B is eight bits wide, the inverter is also eight bits wide. The output of the inverter is input to the second input of the mux. The most significant bit (MSB) of both the A and B inputs are input to the XOR gate 68. The control input to the mux is the output of the XOR gate. The output of the XOR gate is also input to the carry in ($C_{IN}$) input of the adder. The output of the adder 62 forms the output of the summation unit 20.

The operation of the adder/subtractor unit is as follows. As mentioned previously, the adder/subtractor unit functions to add the magnitudes of A and B regardless of their sign. Thus, if A and B are positive then A and B are simply added. If A and B are both negative then A and B should also be added together resulting in a negative number but having the proper magnitude. On the other hand, if A is positive and B is negative, then in order to preserve the correct magnitude at the output, B must be subtracted from A rather than added to it, i.e., A–B must be performed. Similarly, if A is negative and B is positive, B must again be subtracted from A in order to preserve the proper magnitude at the output of the adder/subtractor. The following table illustrates these relationships.

| | Calculation Performed by the Adder | |
| --- | --- | --- |
| | Positive B (B+) | Negative B (B–) |
| Positive A (A+) | A + B | A – B |
| Negative A (A–) | A – B | A + B |

The summation unit 20 of FIG. 3 (i.e., the adder/subtractor 63) performs these calculations. If A is positive and B is positive, the output of the XOR gate is a 0 and the non inverted B is added to A. If A is positive and B is negative, the output of the XOR gate is a 1 and the inverted B is added to A. In order to correctly perform the subtraction the two's compliment of B must be calculated. This requires adding a '1' to the one's compliment of the value. The '1' is added through the CIN of the adder which is a '1' only when the value B is to be subtracted (i.e., A–B). If A is negative and B is positive, the output of the XOR gate is a 1 and the inverted B is added to A to generate A–B. Finally, if A is negative and B is negative, A is added to the non inverted B. Thus, the summation unit preserves the magnitude of the sum but can output either a positive or negative value depending on the inputs.

Multiple levels of summation units can be stacked one upon the other to generate the sum of the absolute differences of any arbitrary number of values. In all such circuits only one absolute value function is required, after the final sum is generated. This is true because the magnitude of all the partial sums is preserved as the sums propagate from stage to stage.

Figure 5:
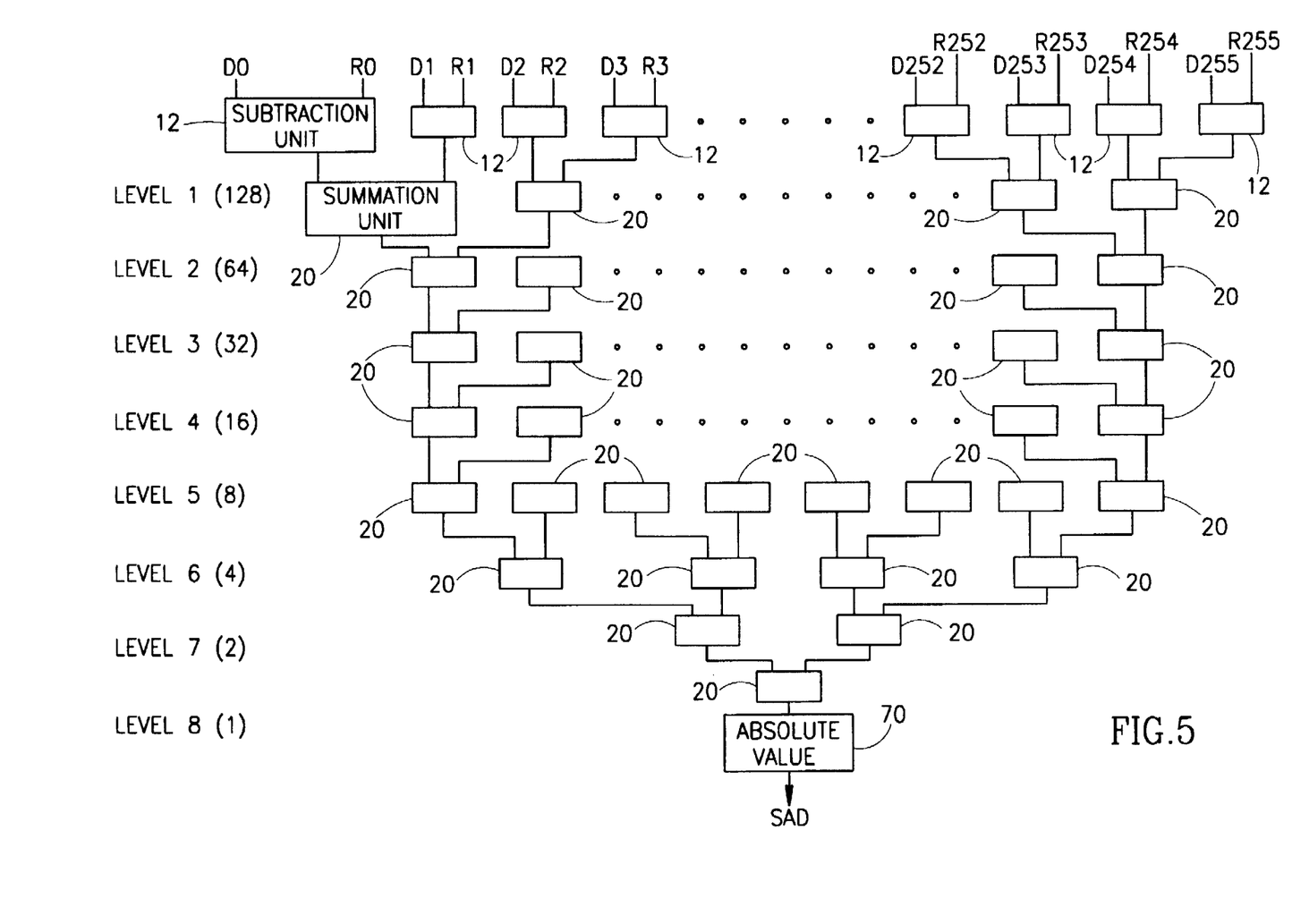
FIG. 5 is a high level block diagram illustrating the SAD processing unit of the present invention applied to a circuit for calculating the sum of the absolute difference between two sets of 256 values.

A high level block diagram illustrating the SAD processing unit of the present invention applied to a circuit for calculating the sum of the absolute difference between two sets of 256 values is shown in FIG. 5. In this circuit, the sum of the absolute differences between two arrays D and R, each having 256 values, is calculated. The values in array D are represented as D0, D1 ... D255, and the values in array R are represented as R0, R1 ... R255. The values of each array corresponding to equivalent positions in the array are input to a subtractions unit 12 as shown in the top row of FIG. 4, i.e., D0 and R0 are input to one subtraction unit, D1 and R1 are input to another subtraction unit, etc. The outputs of every two subtraction units are input to a summation unit 20. Thus, 128 summation units form Level 1. The outputs of the summation units of Level 1 are input to the 64 summation units of Level 2. Upon each successive level, the number of summation units is halved because each unit receives two outputs from the previous level. Thus, Level 3 comprises 32 summation units, Level 4 comprises 16 summation units, Level 5 comprises 8 summation units, Level 6 comprises 4 summation units, Level 7 comprises 2 summation units and Level 8 comprises one summation unit. The output of the final summation unit in Level 8 is input to an absolute value function 70 to generate the final SAD value. Note that like the circuit of FIG. 1, the circuit of FIG. 4 only requires one absolute value function after the final summation unit.

Figure 6:
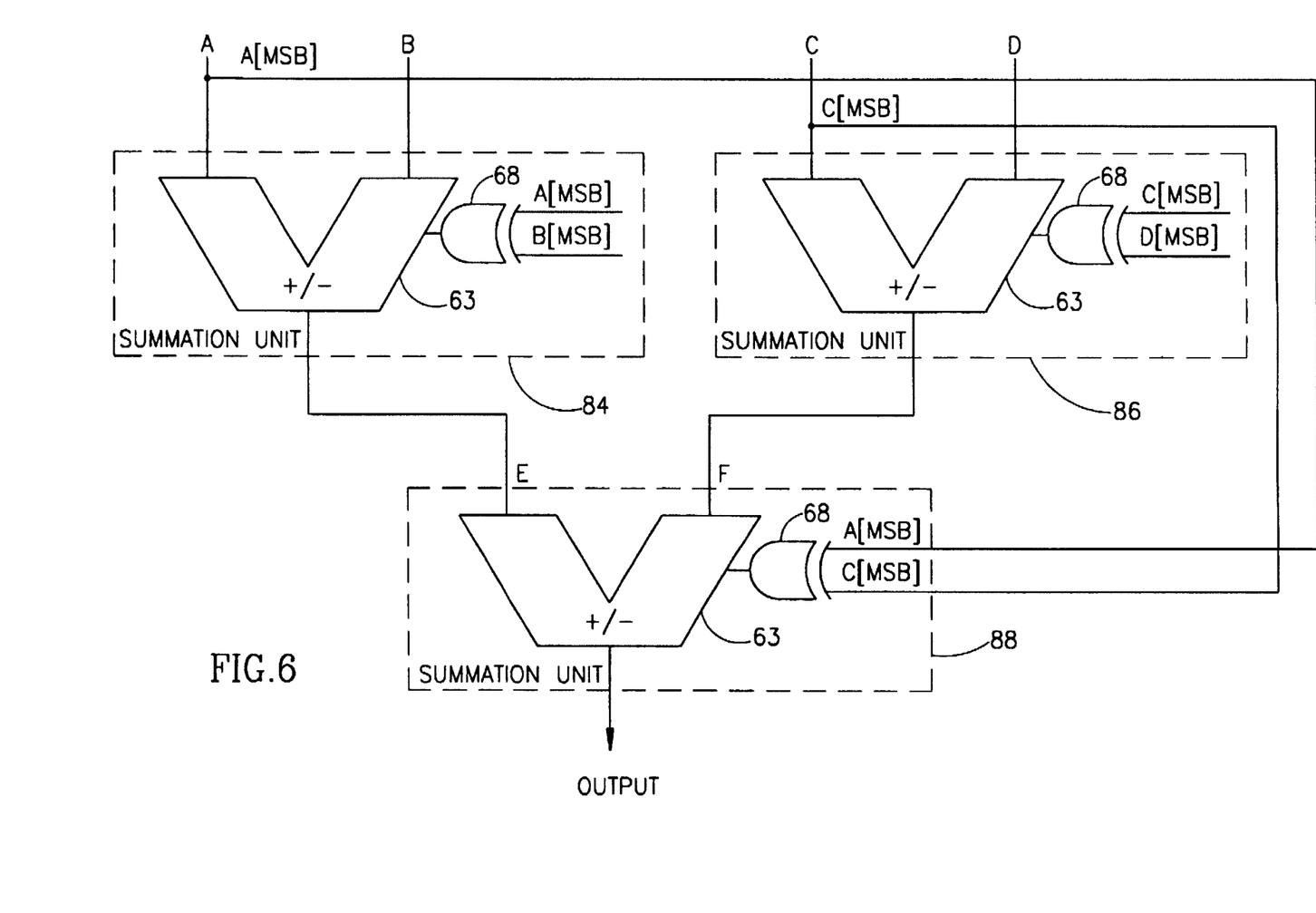
FIG. 6 is a high level block diagram illustrating an alternative embodiment for the summation unit which is capable of more quickly determining whether to add or subtract.

A high level block diagram illustrating an alternative embodiment for the summation unit which is capable of more quickly making the determination of whether to add or subtract is shown in FIG. 6. As discussed previously, the summation unit 20 of FIG. 3 utilizes the MSBs of both inputs to the adder/subtractor to determine whether to add or subtract. The worst case time delay, assuming ripple adders are used in the stages preceding the present one, occurs when a carry must propagate from the LSB to the MSB of the sum. Thus, the MSBs of both the two inputs to the current stage can be delayed, in the worst case, for an entire propagation time through the previous adder.

An inspection of the table of the calculations performed by the adder, presented above, shows that if input A is positive, the output sum is also positive, regardless of the sign of input B. Similarly, if input A is negative, the output sum is also negative, regardless of the sign of input B. Thus, the sign bit of the 'A' inputs of the two neighboring stages preceding the current one can be fed forward to decrease the propagation delays associated with the summation process.

In the example presented in FIG. 6, two summation units 84, 86 have inputs A, B and inputs C, D, respectively. Their respective outputs are coupled to input E and input F of a third summation unit 88. The inputs to the XOR gate 68 of summation unit 84 are the MSBs of the A and B inputs. Similarly, the inputs to the XOR gate 68 of summation unit 86 are the MSBs of the C and D inputs. The inputs to the XOR gate 68 of the summation unit 88 comprise the MSBs of input A and C. Feeding forward the two MSBs serves to eliminate the propagation delay of the ripple adders of the summation units 84, 86.

Figure 7:
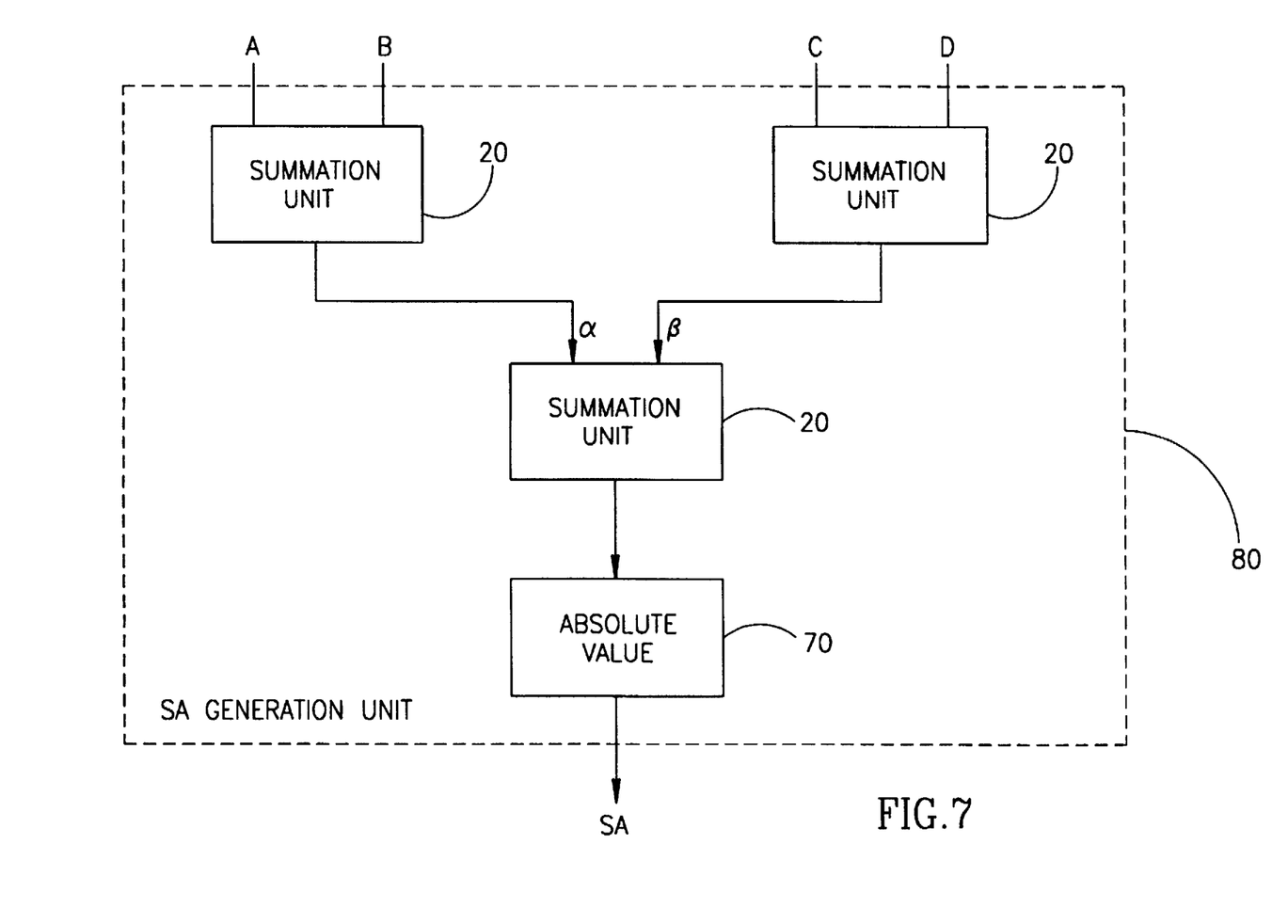
FIG. 7 is a high level block diagram illustrating the SA generation unit of the present invention.

In an alternative embodiment, the present invention is applied to calculate the sum of the absolute values (SA) without generating the differences first. In other words, the summation units can be used to sum any type of signed input values and not just difference values. A high level block diagram illustrating a sum of the absolute values generator, generally referenced 80, is shown in FIG. 7. The SA generator 80 of FIG. 7 comprises a plurality of summation units 20 having inputs A, B, C, D and a single absolute value function 70. Its operation is identical to that of the SAD generation unit of FIG. 1 with the difference being that inputs A, B, C, D can be any value. As in the SAD generation unit of FIG. 1, the SA generator preserves the magnitude of the partial sums until the final summation unit. Only the result of the final summation unit is input to an absolute value function.

Figure 8:
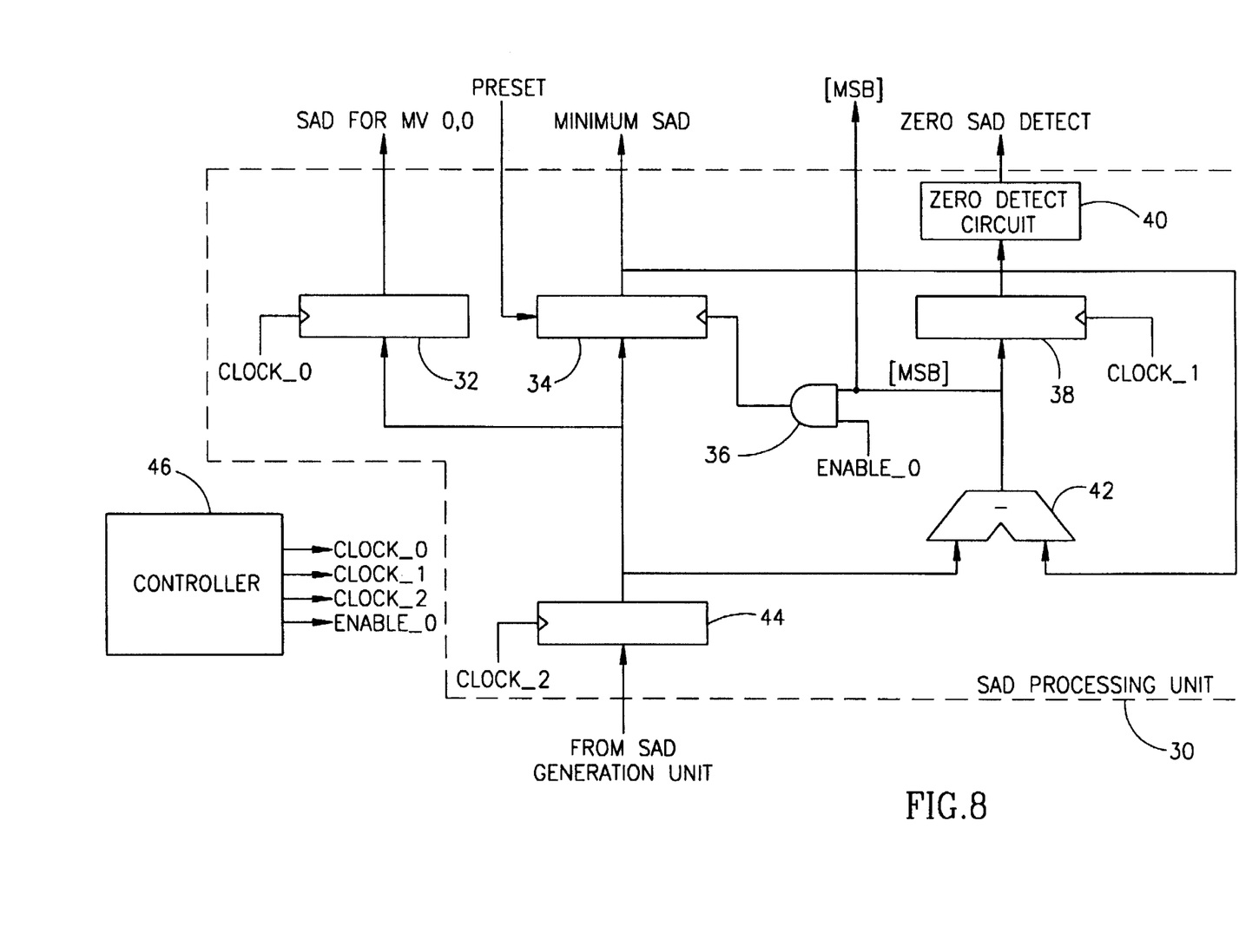
FIG. 8 is a high level block diagram illustrating a SAD processing unit of the present invention as applied to a motion estimation system.

A high level block diagram illustrating a SAD processing unit of the present invention as applied to a motion estimation system is shown in FIG. 8. In motion estimation systems, various techniques are used to estimation the relative motion of blocks pixels from one frame of video to the next. This reduces the overall bandwidth needed to transmit the video signal. Each frame is divided into blocks of pixels each typically an array of 16×16 pixels. Processing algorithms try to find where a block of pixels moved by finding a block that gives a minimum SAD result. Each best matching block has with it an associated motion vector (MV) and a SAD value which should be the minimum SAD found for all the blocks searched. The motion vector is used to determine a blocks new relative position in the next frame.

The SAD value is utilized in the encoding process in generating the encoded video output signal. As stated previously, a search is performed for each block through a range of motion vectors. The search is made in order to determine the motion vector that gives a minimum SAD result. Thus the minimum SAD is a useful quantity. In addition, it is useful for the encoding algorithm to know the value of the SAD for the motion vector equal to 0, 0. In other words, the SAD for the block of pixels in the next frame that are located in the very same position as the previous frame. It is also useful for the encoding algorithm to know when the current SAD is equal to the current minimum SAD. The SAD processing unit 30 of FIG. 8 can be used to determined all these values.

Referring to FIG. 8, the SAD processing unit 30 comprises latches 44, 32, 34 and 38, subtractor 42, AND gate 36 and zero detect circuit 40. In addition, a controller 46 functions to generate the various clock and enable signals used by the SAD processing unit. The SAD is generated by a SAD generation unit constructed using the principles of the present invention. The SAD result is clocked into a latch 44 via clock signal CLOCK_2.

To generate the SAD for the 0, 0 motion vector, the SAD held in latch 44 is clocked into latch 32 via CLOCK_0 only when the SAD in latch 44 corresponds to the 0, 0 motion vector, which is determined by the controller 46.

The minimum SAD is determined by subtracting the current SAD from the current minimum SAD and saving the current SAD as the new minimum if it less than the current minimum SAD. The current minimum SAD, held in latch 34, is input to one input of the subtractor 42. The other input is the current SAD from latch 44. If the result of the subtraction is negative as determined by the MSB of the difference than the current SAD is made the new minimum. The MSB of the subtractor output is input to AND gate 36 and when enabled by ENABLE_0, serves as the clock for latch 34. Note that initially, latch 34 which contains the current minimum SAD, is loaded with all ones in order that the initial current minimum is the largest possible SAD value. A PRESET input signal is shown input to the latch 34. This is necessary in order that valid minimum SAD values will be stored in latch 34.

In addition, the MSB of the difference result from the subtractor 42 is used to notify the controller that a new minimum SAD has been found. The MSB will be active only when the current SAD is less than the current minimum SAD.

To detect a zero SAD difference, the clock signal CLOCK_1 is used to clock in the difference result from the subtractor which is then input to the zero detect circuit 40. The zero detect circuit outputs a signal when the current minimum SAD is equal to the current SAD held in latch 44 (i.e., the difference between them is zero).

Figure 9:
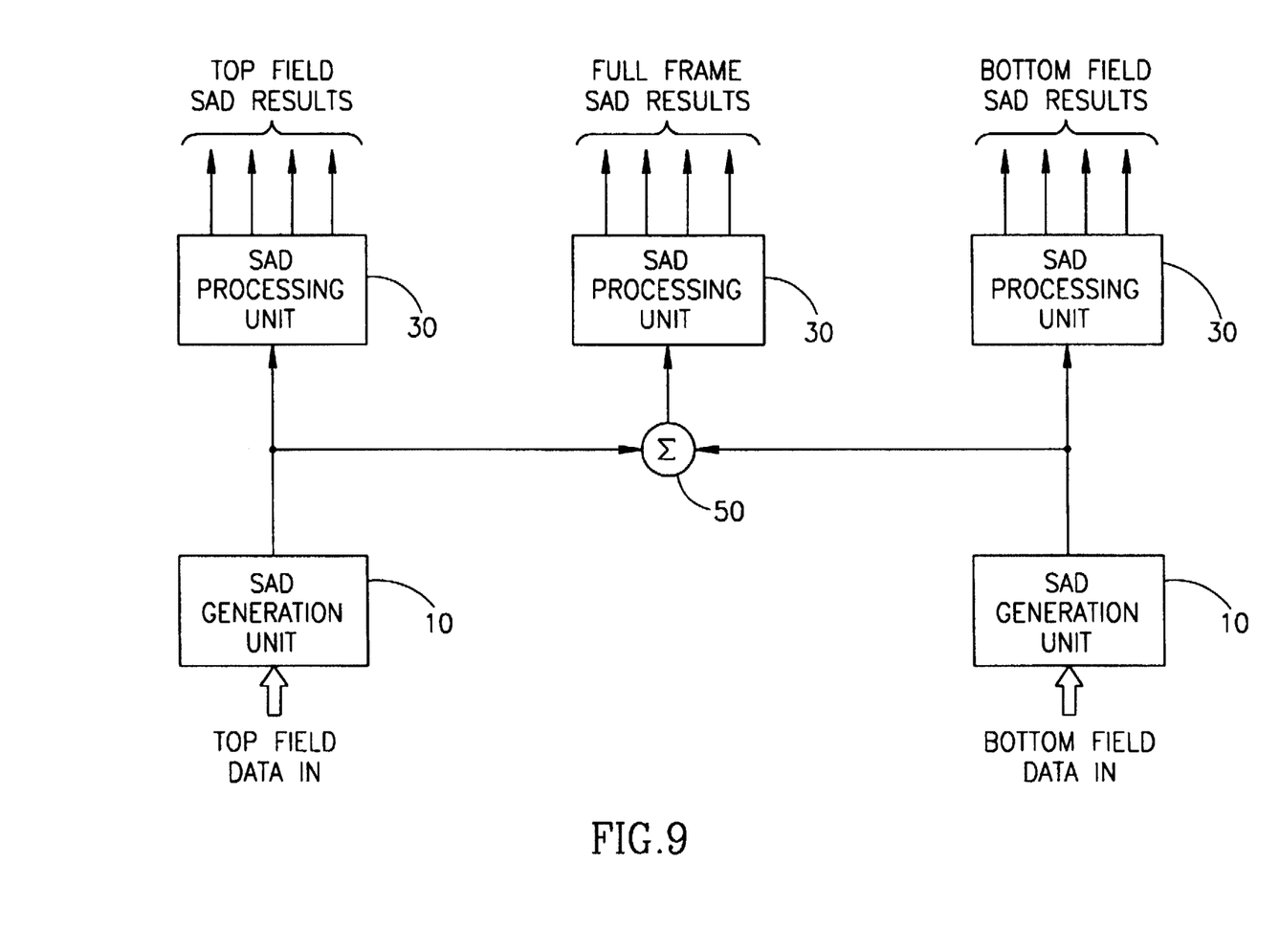
FIG. 9 is a high level block diagram illustrating the SAD processing unit of FIG. 5 applied to the top and bottom fields of a video signal within the context of a motion estimation system.

The SAD processing unit of FIG. 8 can be applied to a video processing system wherein the SAD is calculated for the top field, bottom field and combined full frame of an interlaced video signal. Shown in FIG. 9 is a high level block diagram illustrating the SAD processing unit of FIG. 8 applied to an interlaced video signal within the context of a motion estimation system. Two SAD generation units 10 calculate the SAD for each of the top field and bottom field. An adder 50 combines these results to generate a SAD for the full frame. The top and bottom SAD results are input to SAD processing units 30 which generate top and bottom field SAD results respectively. The output of the adder 50 is input to a third SAD processing unit 30 which generates full frame SAD results.

While the invention has been described with respect to a limited number of embodiments, it will be appreciated that many variations, modifications and other applications of the invention may be made.

What is claimed is:

1. A sum of the absolute values (SA) generator for summing the absolute values of a plurality of values, comprising:

a plurality of levels, each level comprising a plurality of summation units, each summation unit having a first input, a second input and an output, within a first level: said first input and said second input of each said summation unit coupled to two inputs, the outputs of every two summation units are coupled to the first input and the second input of a summation unit in the subsequent level N+1 until a level has only one final summation unit;

wherein each said summation unit within said plurality of levels is operative to sum the values present at its first and second inputs while preserving the magnitude thereof regardless of sign; and an absolute value generator having an input and an output, said output of said final summation unit coupled to said input of said absolute function generator, said output of said absolute function generator forming the output of said SA generator.

2. The SA generator according to claim 1, wherein said summation unit comprises an adder/subtractor.

3. The SA generator according to claim 1, wherein said summation unit comprises means for generating the sum of the magnitudes of the values present at said first and second inputs of said summation unit regardless of the sign of said values.

4. The SA generator according to claim 1, wherein said summation unit comprises a third input, a fourth input and determining means for deciding whether to add said first input to said second input or subtract said second input from said first input in accordance with the values of said third and fourth input, said third input coupled to the most significant bit of the first input to the summation unit in a level directly preceding the current level whose output is coupled to said first input of said summation unit, said fourth input coupled to the most significant bit of the first input to the summation unit in a level directly preceding the current level whose output is coupled to said second input of said summation unit, said determining means operative to reduce the propagation delay of said summation units within the current level.

5. A sum of the absolute values (SA) generator for summing the absolute values of a plurality of values, comprising:

a plurality of levels, each level comprising a plurality of summation units, each summation unit having a first input, a second input and an output, within a first level: said first input and said second input of each said summation unit coupled to two inputs, the outputs of every two summation units are coupled to the first input and the second input of a summation unit in the subsequent level N+1 until a level has only one final summation unit;

wherein each said summation unit within said plurality of levels is operative to sum the values present at its first and second inputs while preserving the magnitude thereof regardless of sign; and an absolute value generator having an input and an output, said output of said final summation unit coupled to said input of said absolute function generator, said output of said absolute function generator forming the output of said SA generator;

wherein said summation unit comprises:

an adder having a first and a second input, a carry in input and an output, said first input of said summation unit coupled to said first input of said adder, said output of said adder forming the output of said summation unit;

a 2 to 1 multiplexor having a first and a second input, an output and a control input, said first input of said multiplexor coupled to said second input of said summation unit;

an inverter having an input and an output, said second input of said summation unit coupled to said input of said inverter, said output of said inverter coupled to said second input of said multiplexor; and an XOR gate having two inputs and an output, the sign bits of said first and second inputs to said summation unit coupled to said inputs of said XOR gate, said output of said XOR gate coupled to said control input of said multiplexor and to said carry in input of said adder.

6. A sum of the absolute difference (SAD) generator for summing the absolute difference between a first and second set of values, comprising:

a plurality of subtraction units, each subtraction unit having a first and second input and an output, said first set of values coupled to said first inputs of said plurality of subtraction units, said second set of values coupled to said second inputs of said plurality of subtraction units;

a plurality of levels, each level comprising a plurality of summation units, each summation unit having a first input, a second input and an output, within a first level: said outputs of every two said subtraction units coupled to said first input and said second input of a summation unit, at each level N, the outputs of two summation units coupled to the first input and the second input of a summation unit in the subsequent level N+1 until a level has only one final summation unit;

wherein each summation unit within said plurality of levels is operative to sum the values present at its first and second inputs while preserving the magnitude thereof regardless of sign; and an absolute value generator having an input and an output, said output of said final summation unit coupled to said input of said absolute function generator, said output of said absolute function generator forming the output of said sum of the absolute difference generator.

7. The sum of the absolute difference generator according to claim 6, wherein said subtraction unit comprises a subtractor.

8. The sum of the absolute difference generator according to claim 6, wherein said subtraction unit comprises means for calculating the difference between the values present at said first and second input of said subtraction unit.

9. The SAD generator according to claim 6, wherein said summation unit comprises:

an adder/subtractor having a control input; and an XOR gate having two inputs and an output, the sign bits of said first and second inputs to said summation unit coupled to said inputs of said XOR gate, said output of said XOR gate coupled to said control input of said adder/subtractor.

10. The SAD generator according to claim 9, wherein said adder/subtractor comprises:

an adder having a first and a second input, a carry in input and an output, said first input of said summation unit coupled to said first input of said adder, said output of said adder forming the output of said summation unit;

a 2 to 1 multiplexor having a first and a second input, an output and a control input, said control input of said multiplexor forming said control input of said adder/subtractor, said first input of said multiplexor coupled to said second input of said summation unit; and an inverter having an input and an output, said second input of said summation unit coupled to said input of said inverter, said output of said inverter coupled to said second input of said multiplexor.

11. The SAD generator according to claim 6, wherein said summation unit comprises means for generating the sum of the magnitudes of the values present at said first and second inputs of said summation unit regardless of the sign of said values.

12. A sum of the absolute differences (SAD) processing system, said processing system summing the absolute difference between a first and second set of values, said values derived from blocks of pixels, said system comprising:

a plurality of subtraction units, each subtraction unit having a first input, a second input and an output, said first set of values coupled to said first inputs of said plurality of subtraction units, said second set of values coupled to said second inputs of said plurality of subtraction units;

a plurality of levels, each level comprising a plurality of summation units, each summation unit having a first input, a second input and an output, within a first level: said outputs of every two said subtraction units coupled to said first input and said second input of a summation unit, at each level N, the outputs of two summation units are coupled to the first input and the second input of a summation unit in the subsequent level N+1 until a level has only one final summation unit;

wherein each summation unit within said plurality of levels is operative to sum the values present at its first and second inputs while preserving the magnitude thereof regardless of sign;

an absolute value generator having an input and an output, said output of said final summation unit coupled to said input of said absolute function generator, said output of said absolute value generator forming the sum of the absolute differences; and means for determining at least one SAD result from blocks of pixels derived from a video signal.

13. The system according to claim 12, wherein said at least one SAD result comprises the sum of the absolute differences for a block of pixels having a motion vector of 0, 0.

14. The system according to claim 12, wherein said at least one SAD result comprises the minimum SAD over a range of blocks of pixels.

15. The system according to claim 12, wherein said at least one SAD result comprises a zero detect signal corresponding to a current SAD value being equal to a current minimum SAD value.

16. The system according to claim 12, wherein said video signal comprises a separate top field.

17. The system according to claim 12, wherein said video signal comprises a separate bottom field.

18. The system according to claim 12, wherein said system further comprises means for determining sum of the absolute difference results from the combination of sum of the absolute differences from a top video field and a bottom video field.

19. A method of generating a sum of the absolute differences between a first and second set of values, said method comprising the steps of:

subtracting values in said second set from corresponding values in said first set, said subtraction possibly producing both positive and negative differences;

summing said differences utilizing a plurality of levels, wherein in each level N a plurality if sums are generated so as to preserve the magnitude of each difference regardless of its sign;

generating a final sum result; and determining the absolute value of said final sum result.

* * * * *